Figure 1:
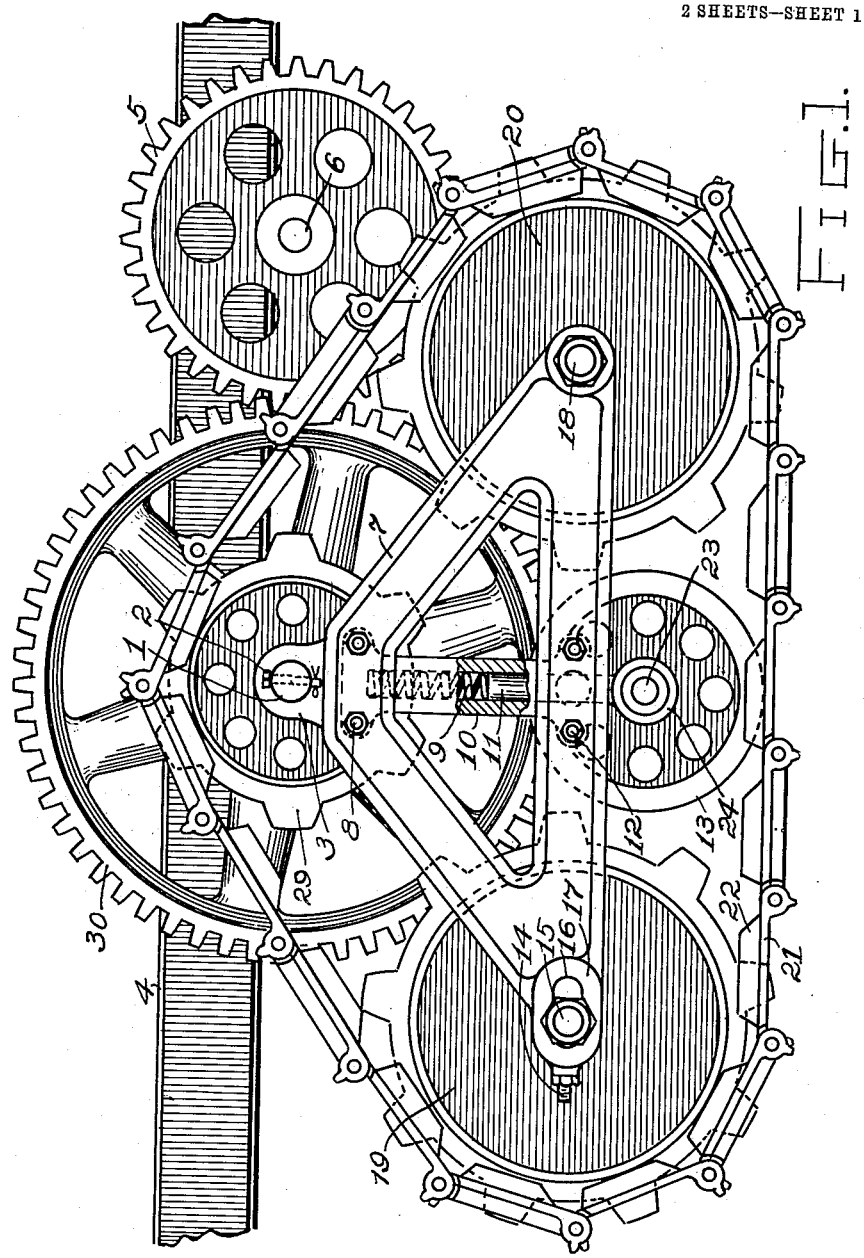

H. W. LEAVITT.
TRACTOR.
APPLICATION FILED APR. 21, 1913.

1,112,460.

Patented Oct. 6, 1914.
2 SHEETS—SHEET 1.

WITNESSES:
H. B. Burr.
C. Lindner

INVENTOR
H. W. LEAVITT.
by G. C. Kennedy,
ATTORNEY.

H. W. LEAVITT.
TRACTOR.
APPLICATION FILED APR. 21, 1913.
1,112,460.
Patented Oct. 6, 1914.
2 SHEETS—SHEET 2.
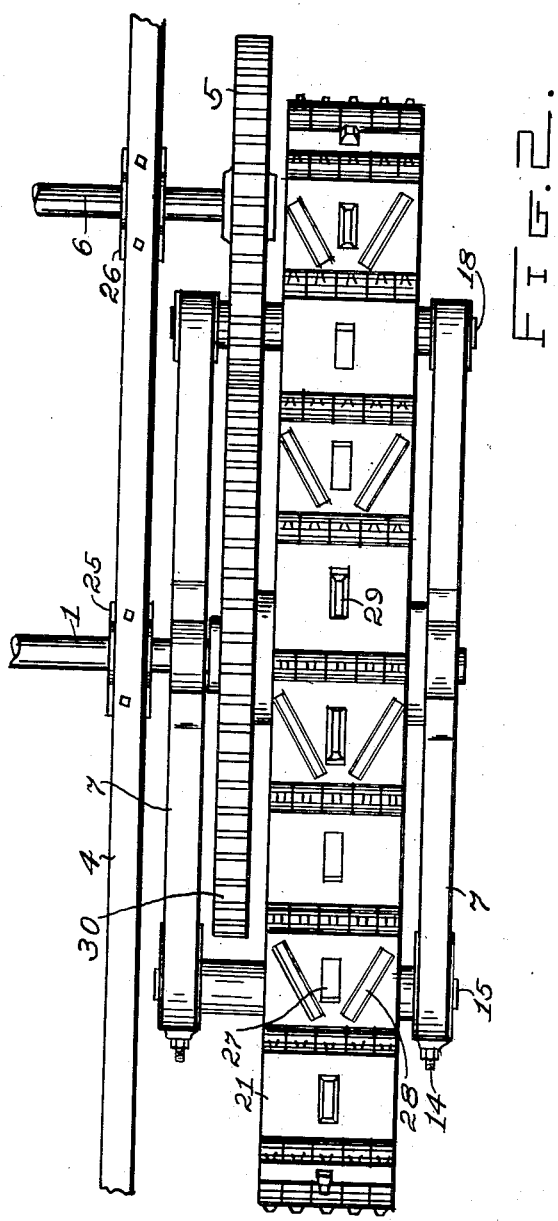
WITNESSES:
H. A. Burr.
C. C. Lindner.
INVENTOR
H. W. LEAVITT
by G. C. Kennedy,
ATTORNEY

UNITED STATES PATENT OFFICE.

HARRY W. LEAVITT, OF PARIS, MISSOURI.

TRACTOR.

1,112,460.  Specification of Letters Patent.  Patented Oct. 6, 1914.

Application filed April 21, 1913. Serial No. 762,614.

*To all whom it may concern:*

Be it known that I, HARRY W. LEAVITT, a citizen of the United States of America, and a resident of Paris, Monroe county, Missouri, have invented certain new and useful Improvements in Tractors, of which the following is a specification.

My invention relates to improvements in tractors, and the object of my improvement is to provide for a tractor removable traction-belt devices for use alternatively with ordinary traction carrying-wheels for employment on certain descriptions of soils and surfaces, such traction-belt devices being so formed and adapted relatively to the superincumbent structures as to support the same steadily by conforming their positions and locations suitably to overcome obstructions in the way or other impediments to a continued progress of the machine in either direction. This object I have accomplished by the mechanism which is hereinafter described and claimed, and which is illustrated in the accompanying drawings, in which:

Figure 1, is a detail side elevation of my improved link-belt traction device as applied to and operatively supporting a tractor-frame. Fig. 2 is an upper plan view of the mechanism shown in said Fig. 1.

Similar numerals of reference denote corresponding parts throughout the several views.

The numeral 4 denotes a portion of the horizontal side-bar of the frame of a power-driven vehicle or tractor, having spaced bearings 25 and 26 secured to its lower edge or face, in which are mounted the shafts 1 and 6 respectively. The shaft 6 is rotatable, and may be actuated by any convenient source of power, and has on its outer end a pinion 5. The shaft 1 may be either fixed or rotatable, but as described here will be considered as fixed relatively to the frame-bar 4, with its outer ends projecting beyond said frame a desired distance, and having a key-seat for a key or cotter-pin 2. It being understood that the projecting outer ends of the shaft are usually employed to mount a fixedly connected gear-rim in mesh with said pinion, and a carrying traction-wheel, it will be seen that when it is desired to use the tractor over very rough or slippery soils or surfaces, and consequently employ a link-belt traction device in lieu of said connected rim and traction-wheel, my invention of a removable device of the latter kind will be both convenient and practical for the purpose, as hereinafter described. It being therefore understood that such a fixedly-connected traction-wheel and gear-rim has been removed from each end of said shaft 1, sub-frame pairs 7, spaced apart, may be pivotally suspended from the ends of said shaft, said frame-members 7 being like in form and dimensions and rigidly connected by the fixed shafts 15 and 18 located in bearings in their lower opposite corners or angles. The shaft 15, however is seated in slots 16 in said members, and secured slidably therealong by means of bolts and nuts 14 in the bearing-parts 17, to permit of adjustable spacing of said shafts from one another. Between said members in each pair, a sprocket-wheel 29 is rotatably mounted on said shaft 1. Like sprocket-wheels 19 and 20 are rotatably mounted on the other said shafts 15 and 18, and in each pair of said sub-frames 7 each set of three sprocket-wheels 29, 19 and 20 are meshed operatively with a link-belt traction-chain composed of pivotally or hinge-connected links 21. The three sprocket-wheels are so arranged in a triangular order as shown with the smaller wheel 29 uppermost and located above the medial space between the other wheels, the others being located horizontally and longitudinally relative to said frame 4. Mounted also upon said shaft 1, at either end, are large gear-wheels 30, and fixedly connected by means of a common integral hub in each case with the sprocket-wheels 29. The wheels 30 are intermeshed with the driving-pinions 5.

The links 21 of the traction-belt are of the usual widened tread, with medial openings 27 to receive the teeth of said sprocket-wheels, and having divergingly-arranged integral cleats 28 on their outer faces, their inner faces being smooth and level, except for pairs of longitudinally-spaced lugs 22 thereon on either side of their openings 27.

The numeral 10 denotes pairs of vertical boxes seated between the members of the sub-frames 7, having cylindrical bores 11 open at their lower ends to receive first, compression coiled springs 9, and second the cylindrical vertical stems of forks having alined bearings to receive the pintle-shafts 23 of the traveler-wheels 13. The circumferential edges of the wheels 13 are smooth and adapted to travel upon the inner faces of the links 21 of said traction-belt just without the lugs 22. The upper flattened parts of the bodies 10 are removably secured to the upper parts of the frame-members 7 by means of the bolts 8, near the bearing lugs 3 of said members.

When the driving-pinion 5 rotates, it impels the gear-wheel 30 with the sprocket-wheel 29, which latter drives the link-belt over the sprocket-idlers 19 and 20, to propel the vehicle or tractor on its way. In coming upon some obstruction, the idler 19 or 20, whichever first encounters said obstacle, according to the direction the tractor is progressing, will mount the obstacle and pass it in swinging up the sub-frame 7 on its pivotal suspension on the shaft 1. In like manner the traveler-wheel 13 will move up yieldingly against the compression-spring 9 to mount the obstruction and pass over it with the underlying link-belt, said springs 9 thus resiliently supporting the tractor-frame in such emergencies to prevent breakage, while holding the frame level. The chain-belt is left slack enough to permit of some such yielding movements under stresses of the kind described. Since the traction-device is thus pivotally mounted relative to said frame, and has intermediate yielding supporting-means, it is peculiarly fit for traction over rough or slippery surfaces, where the ordinary traction-wheels would slip and fail to propel the vehicle efficiently or at all.

Having described my invention, what I claim as new, and desire to secure by Letters Patent, is:

In a tractor, a main frame, a shaft fixedly mounted in said frame, a gear wheel and a pinion fixedly connected together and rotatably mounted upon said shaft, a rotatable shaft mounted in said frame, a pinion fixed on said rotatable shaft and in mesh with said gear wheel, hangers pivotally suspended on said fixed shaft on opposite sides of said sprocket wheel and gear wheel, and fixedly connected together in spaced relation, like idler sprocket wheels rotatably mounted between said spaced hangers at their opposite ends, one of the said idler sprocket wheels being mounted in said hangers for longitudinal adjustment therealong, a chain passed about and in mesh with said idler sprocket wheels and with the said sprocket wheel on the fixed shaft, the links of said chain having laterally flattened edges, a pair of upright hollow sockets mounted between said hangers fixedly and medially, and opening downwardly, coiled compression springs seated in the upper parts of said sockets, plungers slidably mounted in said sockets and having their upper ends bearing against said springs with their lower ends provided with bearings, idler wheels mounted in the bearings on said plungers, and adapted to ride yieldingly upon the opposite flattened edges of the inner faces of the links of said chain, the links of said chain being provided with integral projections on the tread surfaces thereof.

Signed at Waterloo, Iowa, this 3rd day of April, 1913.

HARRY W. LEAVITT.

Witnesses:
E. B. PARKHURST,
G. C. KENNEDY.